US005507084A

United States Patent [19]

Richter

[11] Patent Number: 5,507,084

[45] Date of Patent: Apr. 16, 1996

[54] REMOVAL TOOL

[75] Inventor: Karl P. Richter, Columbiaville, Mich.

[73] Assignee: Walbro Corporation, Cass City, Mich.

[21] Appl. No.: 358,238

[22] Filed: Dec. 19, 1994

[51] Int. Cl.$^{6}$ .......... B23P 19/04

[52] U.S. Cl. .......... 29/254

[58] Field of Search .......... 254/18; 29/254, 29/255, 275, 261, 262, 263

[56] References Cited

U.S. PATENT DOCUMENTS

| | | | |
|---|---|---|---|
| 871,083 | 11/1907 | Brown | 254/18 |
| 1,771,712 | 7/1930 | Jimerson | 254/18 |
| 2,570,915 | 10/1951 | Buck | 254/18 |
| 2,779,089 | 1/1957 | Allen | 29/254 |
| 3,739,452 | 6/1973 | Gadberry | 29/254 |
| 4,483,058 | 11/1984 | Clutter et al. | 29/254 |
| 5,181,303 | 1/1993 | Gregg | 29/255 |

*Primary Examiner*—Robert C. Watson
*Attorney, Agent, or Firm*—Barnes, Kisselle, Raisch, Choate, Whittemore & Hulbert

[57] ABSTRACT

A tool for removing a carburetor needle valve adjustment limiter cap has a handle with a set of jaws at one end for engaging the end cap and an actuator at the opposite end for applying force to the jaws to remove the end cap from the valve body. In a preferred form, the actuator has a slidable weight or mass that can be reciprocated along the handle to impact against a stop on the handle at an end opposite from the jaws. In another form, the actuator has a rod extending transversely through the handle and secured to it. In use, the rod is positioned against an abutment to provide a fulcrum about which the handle is pivoted to produce a force to pull the end cap from the valve body.

8 Claims, 2 Drawing Sheets

REMOVAL TOOL

FIELD OF THE INVENTION

This invention relates to tools and more particularly to a tool for removing a limiter cap from a fuel metering valve of a carburetor.

BACKGROUND OF THE INVENTION

In response to relatively recent Federal and State "clean air" regulations, carburetor limiter caps have been used to restrict adjustment of fuel metering valves to prevent the excessive emissions of carbon monoxide and unburned hydrocarbons from an internal combustion engine.

Primarily, limiters have been used with conventional float bowl carburetors to control automobile exhaust emissions. More recently, their use has been extended to diaphragm-type carburetors in small engines simply to prevent gross misadjustment of fuel flow. However, future emissions regulations are expected to extend the role of limiter caps to control engine emissions.

Fuel flow within a carburetor is commonly metered during no-load of idle engine operation by a first "idle" needle valve and during part of full load operation by a second "main" needle valve. Typically, each valve has a threaded shank with an enlarged knurled head at one end and a conical or needle shaped valve control surface at the opposite end which is received within an opening in the carburetor body. To calibrate fuel flow, each valve is rotatably adjusted to axially extend or retract the valve control surface within a fuel passage in the carburetor until optimum fuel flow through the passage is achieved. Precalibration of the carburetor on a flow test bench may be performed prior to being assembled to an engine. After assembly to an engine, it is customary to adjust the metering valves, if needed, to fine tune fuel flow to actual engine demand. Subsequent overadjustment of fuel flow is prevented by affixing a limiter cap over the head of each valve.

These limiter caps generally consist of a cylindrical body having an opening at one end for axially receiving the valve head in tight fitting engagement to prevent easy removal and promote rotation of both in unison. A recess in the opposite end of the cap is provided to enable an adjustment tool to engage the valve directly or the cap alone to rotate both in unison to make fuel flow adjustments. Projecting radially outwardly from the cap body is an arm for abutting against a fixed stop, which may be a projection extending from the carburetor or an adjacent valve shank which may or may not have a cap, to limit valve rotation. Preferred limiter caps are disclosed in U.S. Pat. No. 5,322,645, the disclosure of which is incorporated hereby by reference.

There are times when it may be necessary to remove the limiter caps. For example, the valves may be incorrectly adjusted at the flow test bench in which case it is necessary to remove the limiter caps to correct the valve setting. Additionally, the carburetors may need to be reworked or modified as required by the customer at the engine manufacturing plant requiring re-setting the valves. Furthermore, field servicing dealers may need to remove the limiter caps to service or adjust the carburetor.

SUMMARY OF THE INVENTION

A tool for removing a limiter cap from a fuel flow valve of a carburetor which has a body with a pair of jaws pivotally mounted at one end for opening and closing to engage and disengage the limiter cap. An actuator is provided on the body to provide a removal force to pull the limiter cap from the valve. In one embodiment, the actuator is a weight or mass slidably mounted on the body to contact or impact upon a stop spaced from the jaws.

In another embodiment, the tool body acts as a lever arm which preferably has a fulcrum rod attached to the body of the tool to extend at substantially a right angle. An end of the rod engages an abutment to provide a fulcrum about which the tool body is pivoted to pull the limiter cap from the valve.

Objects, features and advantages of this invention are to provide a tool for easy removal of a limiter cap, reduce time and effort in removing the limiter cap, increase productivity, eliminate the risk of damaging the carburetor by removing the limiter caps incorrectly, and provide a removal tool which is simple, stable, rugged, durable, reliable, quick and easy to use and of relatively simple design and economical manufacture.

BRIEF DESCRIPTION OF THE DRAWINGS

These and other objects, features and advantages of this invention will be apparent from the following detailed description of the best mode, appended claims and accompanying drawings in which:

DETAILED DESCRIPTION

Figure 1:
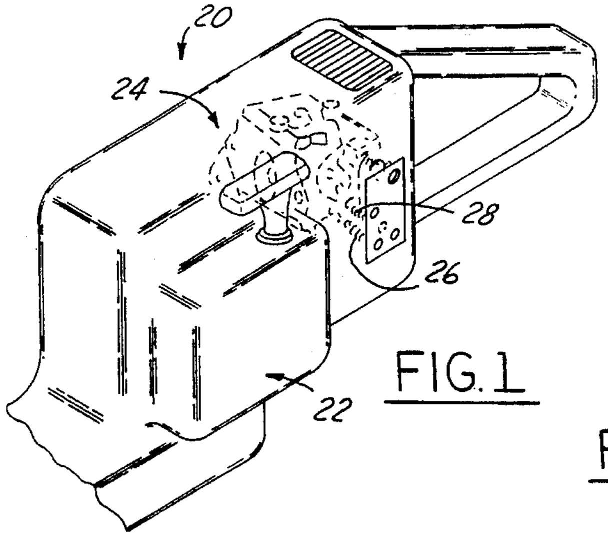
FIG. 1 is a fragmentary perspective view of a hedge trimmer having a two-stroke engine with a carburetor with fuel flow metering needle valves and limiter caps.
Figure 2:
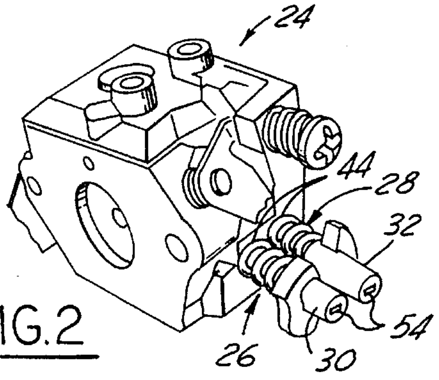
FIG. 2 is a perspective view of the carburetor assembly illustrating limiter caps mounted on both the main and idle needle valves.

With reference to the drawings, FIG. 1 illustrates a typical hand-held power tool 20 such as a hedge trimmer with a two-stroke gasoline engine 22 having a carburetor 24 with idle and main needle valves 26 & 28 having limiter caps 30 and 32 (FIG. 2) thereon. The idle 26 and main 28 needle valves meter fuel flow during idle and load engine operating conditions, respectively.

Figure 4:
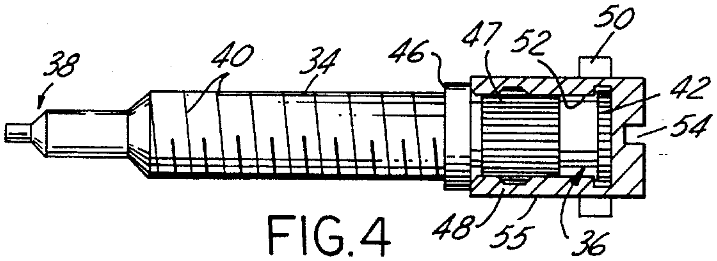
FIG. 4 is a cross-sectional view of the limiter cap on a needle valve.
Figure 3:
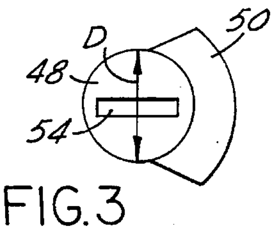
FIG. 3 is a front view of a limiter cap.

As shown in FIGS. 3 and 4, each valve has an elongated generally cylindrical shank 34 with a head 36 at one end and a generally conical valve control surface 38 at the other end.

The shank 34 has a plurality of threads 40 about its outer periphery to engage with complementary threads (not shown) within the carburetor body to removably retain the valve therein and permit axial adjustment of the valve within a fuel flow passage.

To facilitate rotational adjustment of the valve, a recess or slot (not shown) is provided in the free end thereof, or, alternatively, a plurality of axial ridges or axially extending flutes 42 are provided on the outer peripheral surface of the head 36 which may be engaged by an adjustment tool or manually for adjustment. Unintentional valve rotation during engine vibrations is prevented by a spring 44 (FIG. 2) received over the valve shank 34 and disposed between the carburetor body 24 and a flange 46 on the valve shank 34 adjacent the head 36. The cap is releasably retained on the valve for rotation in unison therewith by axially extending ridges or flutes 47 on the head.

Each cap 30,32 has a body 48 with an arm 50 projecting radially therefrom for limiting valve rotation and hence adjustment. For axially telescoping the cap over the end of the valve body or valve shank 34, the cap body 48 has a passage 52 therein. The cap also has a generally slotted recess 54 in the face of the free end of the cap body 48 for receiving an adjustment tool therein.

The limiter arm 50 is an arcuate flange projection which extends generally radially outwardly from the cap body 48 for abutting against a stop carried by or operably associated with the carburetor to limit rotation to less than a complete revolution. The stop may be a projection on the carburetor body and/or an adjacent valve shank, with or without a cap mounted thereon, or the like.

As shown in FIG. 4, the cap is mounted on the valve by telescoping it over the head 36. The cap body 48 is axially pressed onto the head 36 of the valve with an interference fit so that the axially extending flutes 47 frictionally engage or intermesh with the circumferentially continuous wall 55 of the cap body 48. When the cap has been inserted onto the shank head 36, the material of the inner peripheral surface of the wall 55 of the cap body 48 deforms around the flutes 47 to securely couple together the valve and the cap for rotation in unison and to prevent easy removal of the cap therefrom.

Figure 5:
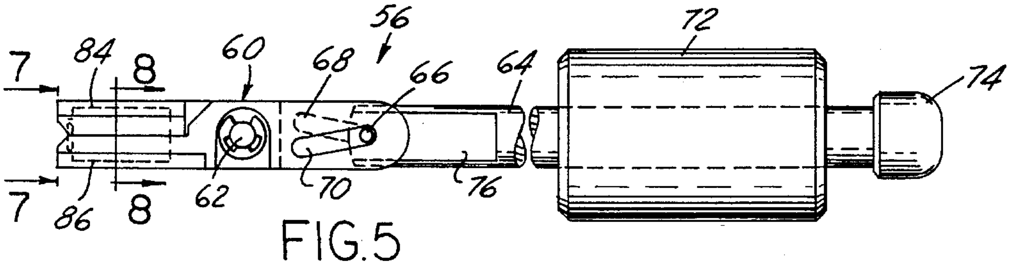
FIG. 5 is a side view of a removal tool embodying the invention.
Figure 6:
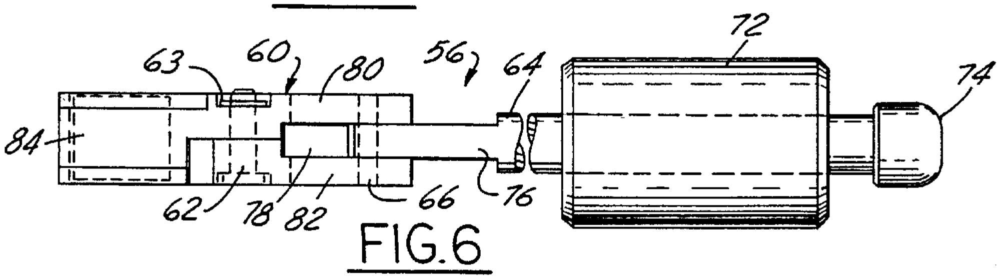
FIG. 6 is a top view of the removal tool.

As shown in FIGS. 5 & 6, the tool 56 for removing the cap has a pair of jaws 60 for gripping the cap which are pivotally connected together by a pin 62 received in a through hole and retained by a snap ring 63. The jaws are connected to a handle shaft 64 for movement to open and closed positions by a pin 66 extending transversely through the handle and slidably received in elongate slots 68 and 70 oppositely inclined at an acute included angle to each other.

For removing the limiter cap, an impact force is applied to the handle shaft 64 by a manually movable mass in the form of a hammer ring 72 slidably received on the handle shaft to strike a stop in the form of an enlarged head 74 at the free end of the handle shaft. When the hammer ring strikes the stop, an impact force is transmitted to the jaws to axially withdraw the caps through the pin 66 received in the slots 68 and 70. Preferably, the pin 66 is permanently secured to the handle shaft such as by being pressed fit therein. The slots 68 and 70 are inclined to converge inwardly toward the free end of the handle for opening and closing the jaws. During removal of the limiter caps the impact force acting through the slots 68 & 70 also tends to urge the jaws to their fully closed position around the limiter caps during removal.

Preferably, to facilitate assembly and relative movement between the handle shaft and the jaws, the handle shaft has a tang 76 with flat parallel faces slidably received in a slot 78 with spaced apart opposed flat faces formed on the arms 80 and 82 of the jaws.

Figure 7:
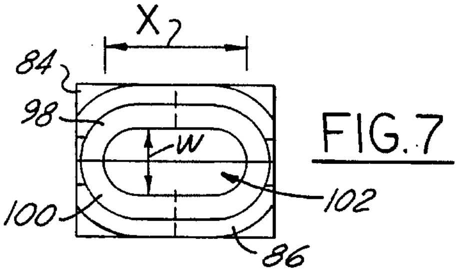
FIG. 7 is an end view of the removal tool taken along line 7—7 in FIG. 5.
Figure 8:
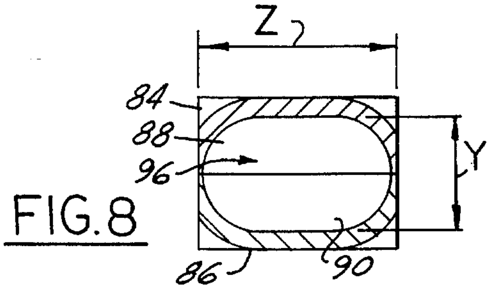
FIG. 8 is a cross-sectional end view of the jaws taken along the line 8—8 in FIG. 5.
Figure 9:
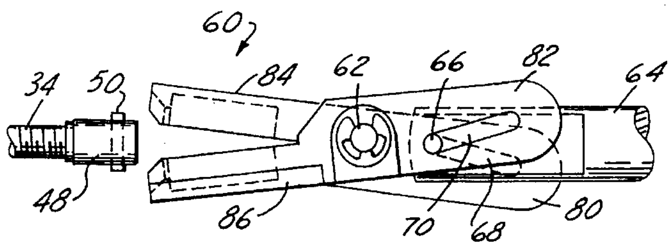
FIG. 9 is an enlarged fragmentary side view of the tool with open jaws approaching a limiter cap.
Figure 11:
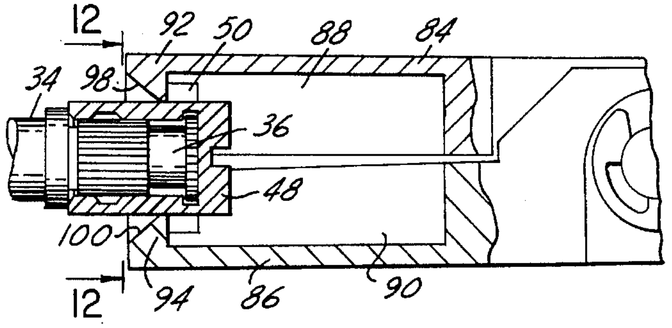
FIG. 11 is a partial cross-sectional side view of the jaws closed over the limiter cap.
Figure 12:
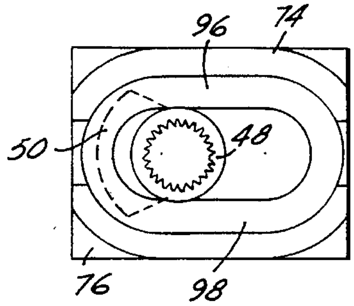
FIG. 12 is an end view taken along line 12—12 in FIG. 11.

To capture and retain the limiter caps, each jaw 84 and 86 has a cavity 88 and 90, respectively, and a radially inwardly extending front flange 92 and 94 (FIG. 11). Each elongated cavity 88 and 90 has rounded sides so that together they form an oblong or generally oval cavity 96 (FIG. 8). To assist in inserting the cap arms 50 into the cavity 96, each flange 92 and 94 has a camming surface 98 and 100 that may engage the outer edges of the arms 50 to open the jaws. The removal force applied by the hammer ring 72 is transmitted to the limiter caps through engagement with the flanges 92 and 94 which overlie the arms 50 when the arms are located in the cavity 96 (FIGS. 11 and 12). To accommodate the diameter D (FIG. 3) of each limiter cap body 48, the flanges 92 and 94 form an oblong opening 102 having a height or minor axis W (FIG. 7) substantially the same or slightly larger than the diameter D of each limiter cap and a width or major axis X equal to or slightly larger than the radius of both limiter cap bodies 48 plus the distance between their centers.

The major axis X (FIG. 7) of the opening 102 accommodates two limiter caps so that when the jaws are closed, the flanges 92 and 94 overlap the arms 50 of both caps. The cavity 96 accommodates two limiter caps including their arms and has a height or minor axis Y equal to or slightly greater than twice the radial extent of the arms 50 of each cap and a width or major axis Z slightly greater than twice this radius plus the distance between the centers of the needle valves or the caps when received thereon.

Figure 10:
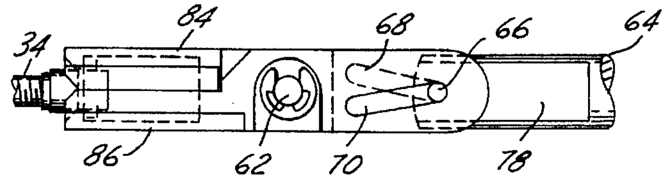
FIG. 10 is a view similar to FIG. 9 showing the jaws engaging the limiter cap.

In use, the jaws are opened by relatively moving them axially toward the handle shaft. As the pin 66 moves to the left from the position of FIG. 10, the camming action between the pin 66 and the slots 68 and 70 causes the jaws to pivot about the pin 62. The jaws are then placed over the end caps so that the arms 50 are located in the jaw cavities 88 and 90 and behind the flanges 92 and 94. The jaws are closed by moving the handle shaft 64 away from the jaws so that the pin 66 is located at the far right hand end of the slots 68 and 70 (FIGS. 5 & 10). The hammer ring 72 is then manually reciprocated along the handle shaft 64 to strike the head 74 of the handle shaft and produce a force on the limiter caps sufficient to remove them by overcoming the frictional forces between the limiter caps and the heads 36 of the valves.

Figure 13:
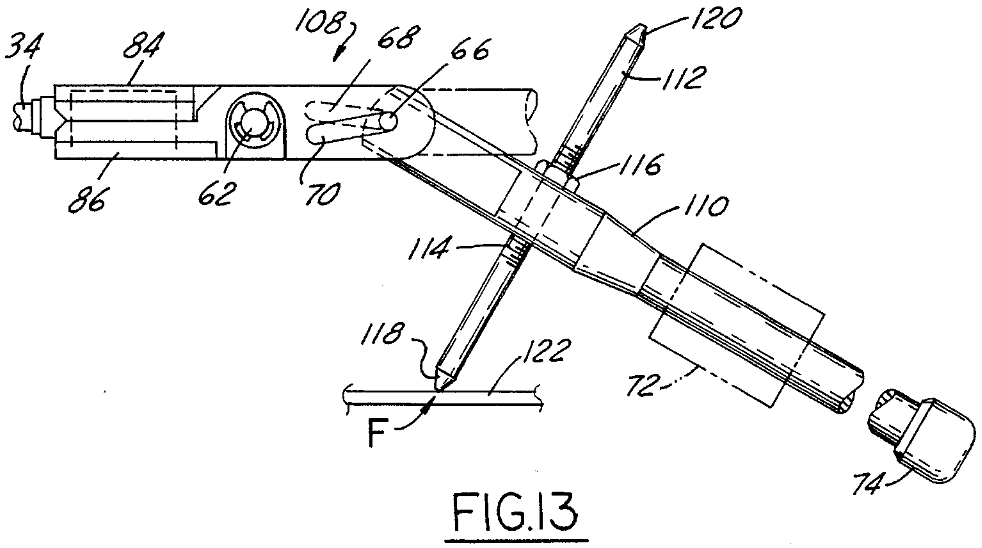
FIG. 13 is a side view of a second embodiment of the removal tool.

FIG. 13 shows another embodiment of a tool 108 which has the same jaws, cams and pins as the tool 56 (as indicated by like reference numerals), and a different handle 110 and mechanism for producing the cap removal force. To provide a fulcrum for pivoting the handle 110 a rod 112 extends generally transversely through the handle and to the axis of the pin 66. The rod has threads 114 received in a complementary threaded hole through the handle and is releasably retained in the adjusted position on the handle by a jamb nut 116.

The rod 112 has opposed ends 118 and 120 either of which can be located to bear on an abutment such as the housing 122 of the carburetor. The removal force is produced by manually pivoting the handle 110 about the fulcrum point F provided by the rod 112. The tool 108 of FIG. 13 need not have a hammer ring on the handle 110. However, if desired, a hammer ring 72 can be provided (as shown in phantom in FIG. 13) resulting in a removal tool with two actuators. This may also be achieved by adding the fulcrum rod 112 to the tool 56 of FIGS. 5 and 6.

In use, one of the ends of the rod 112, for example, end 118 is positioned against an abutment 122 to provide a fulcrum F about which the tool is pivoted to produce a generally axial force on the jaws. As the user applies a downward or clockwise force (as viewed in FIG. 13) to the free end of the tool 110, it pivots about the fulcrum F so that a force is applied through the pin 66 to the jaws to remove the caps by overcoming the frictional forces holding the caps on the needle valves.

I claim:

1. A tool for removing a limiter cap from the stem of a needle valve of a carburetor comprising: a pair of jaws pivotally connected together and movable to open and closed positions, each jaw adjacent one end having a recess therein which forms in cooperation with an opposed recess in the other jaw a cavity for receiving a radially projecting arm portion of an end cap therein when the jaws are closed and having an inwardly projecting flange adjacent said one end which in cooperation with the flange of its opposed jaw provides a portion overlapping the arm portion of the cap when received in the recess with the jaws being closed, a handle operably connected with said jaws, a cam and follower for opening and closing said jaws in response to relative movement between said jaws and said handle, one of said cam or follower being carried by said jaws and the other of said cam or follower being carried by said handle, an actuator carried by said handle for applying force to the jaws for removing a cap received therein from the stem of a valve of a carburetor, and said actuator comprises an elongate threaded rod received within a threaded through opening in said handle so that opposed ends of said rod are located on either side of said handle to contact an abutment.

2. The tool of claim 1 wherein when the jaws are closed the inwardly projecting flanges define an oblong opening having a major axis slightly larger than the radius of two limiter cap bodies disposed in side by side relation plus the distance between the centers of the two cap bodies, and a minor axis slightly larger than the diameter of each limiter cap body.

3. A tool for removing a limiter cap from the stem of a needle valve of a carburetor comprising:

a pair of jaws pivotally connected together and movable to open and closed positions, each jaw adjacent one end having a recess therein which forms in cooperation with an opposed recess in the other jaw a cavity for receiving a radially projecting arm portion of an end cap therein when the jaws are closed and having an inwardly projecting flange adjacent said one end which in cooperation with the flange of its opposed jaw provides a portion overlapping the arm portion of the cap when received in the recess with the jaws being closed, a handle operably connected with said jaws, an elongate slot in each said jaw, a pin carried by said handle and received in the slots for opening and closing said jaws in response to relative movement between said jaws and said handle, and an actuator carried by said handle for applying force to the jaws for removing a cap received therein from the stem of a valve of a carburetor.

4. The tool of claim 3 wherein said actuator comprises a weight slidably received on said handle and a stop located adjacent an end of said handle opposite said jaws to receive an impact force from said weight.

5. The tool of claim 3 wherein said actuator comprises an elongate threaded rod received within a threaded through opening in said handle so that opposed ends of said rod are located on either side of said handle to contact an abutment.

6. The tool of claim 3 wherein the slots of said jaws are oppositely angled.

7. The tool of claim 3 wherein said jaws comprise opposed arms in which the slots are formed, said handle having a flat sided tang in which said pin is mounted so that the tang slides between said opposed arms to move said pin in the slots.

8. The tool of claim 3 wherein when the jaws are closed the inwardly projecting flanges define an oblong opening having a major axis slightly larger than the radius of two limiter cap bodies disposed in side by side relation plus the distance between the centers of the two cap bodies, and a minor axis slightly larger than the diameter of each limiter cap body.

* * * * *